United States Patent
Kodama

(10) Patent No.: US 10,148,837 B2
(45) Date of Patent: Dec. 4, 2018

(54) IMAGE FORMING APPARATUS WITH STARTUP CONTROLLER AND RECORDING MEDIUM

(71) Applicant: Konica Minolta, Inc., Tokyo (JP)

(72) Inventor: Kana Kodama, Anjo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 14 days.

(21) Appl. No.: 15/376,848

(22) Filed: Dec. 13, 2016

(65) Prior Publication Data

US 2017/0180582 A1    Jun. 22, 2017

(30) Foreign Application Priority Data

Dec. 17, 2015   (JP) .................. 2015-245838

(51) Int. Cl.
| | | |
|---|---|---|
| *G06F 11/14* | (2006.01) | |
| *G06F 15/17* | (2006.01) | |
| *G06F 9/44* | (2018.01) | |
| *H04N 1/00* | (2006.01) | |
| *H04N 1/21* | (2006.01) | |
| *G06F 15/177* | (2006.01) | |

(52) U.S. Cl.
CPC ..... *H04N 1/00891* (2013.01); *H04N 1/00037* (2013.01); *H04N 1/00904* (2013.01); *H04N 1/21* (2013.01); *G06F 11/1402* (2013.01); *G06F 11/1417* (2013.01); *G06F 15/177* (2013.01); *H04N 2201/0094* (2013.01)

(58) Field of Classification Search
CPC combination set(s) only.
See application file for complete search history.

(56) References Cited

U.S. PATENT DOCUMENTS

| | | |
|---|---|---|
| 2012/0008165 A1 | 1/2012 | Tanaka |
| 2014/0006828 A1 | 1/2014 | Kanematsu |

FOREIGN PATENT DOCUMENTS

| | | |
|---|---|---|
| JP | 2012-018554 | 1/2012 |
| JP | 2014-010470 | 1/2014 |

*Primary Examiner* — Barbara Reinier
(74) *Attorney, Agent, or Firm* — Buchanan Ingersoll & Rooney PC

(57) ABSTRACT

An image forming apparatus performs, when a power-on operation has been subsequently performed after a power-off operation, a first snapshot developing process regardless of presence or absence of a change related to a device configuration of the image forming apparatus, the first snapshot developing process being performed such that first partial data (evacuation object information about a common device group in various device configurations) of snapshot data are written back from a nonvolatile storage to a volatile storage. In the case where the power-on operation has been performed and it is detected that there is no change related to the device configuration, a second snapshot developing process is also performed such that the second partial data (evacuation object information about a non-common device group whose presence or absence is changeable in the various device configurations) of the snapshot data are written back from the nonvolatile storage to the volatile storage.

14 Claims, 11 Drawing Sheets

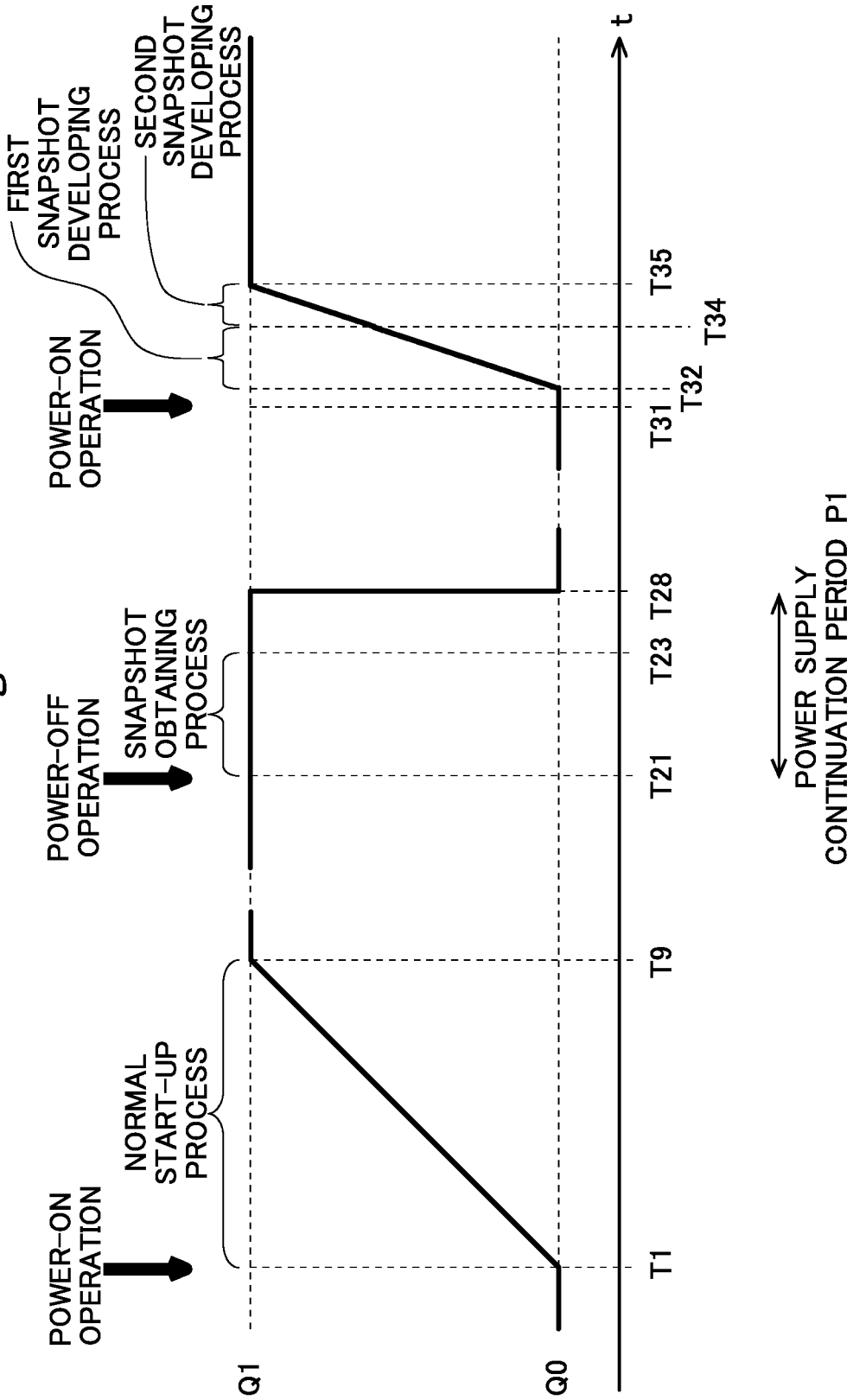

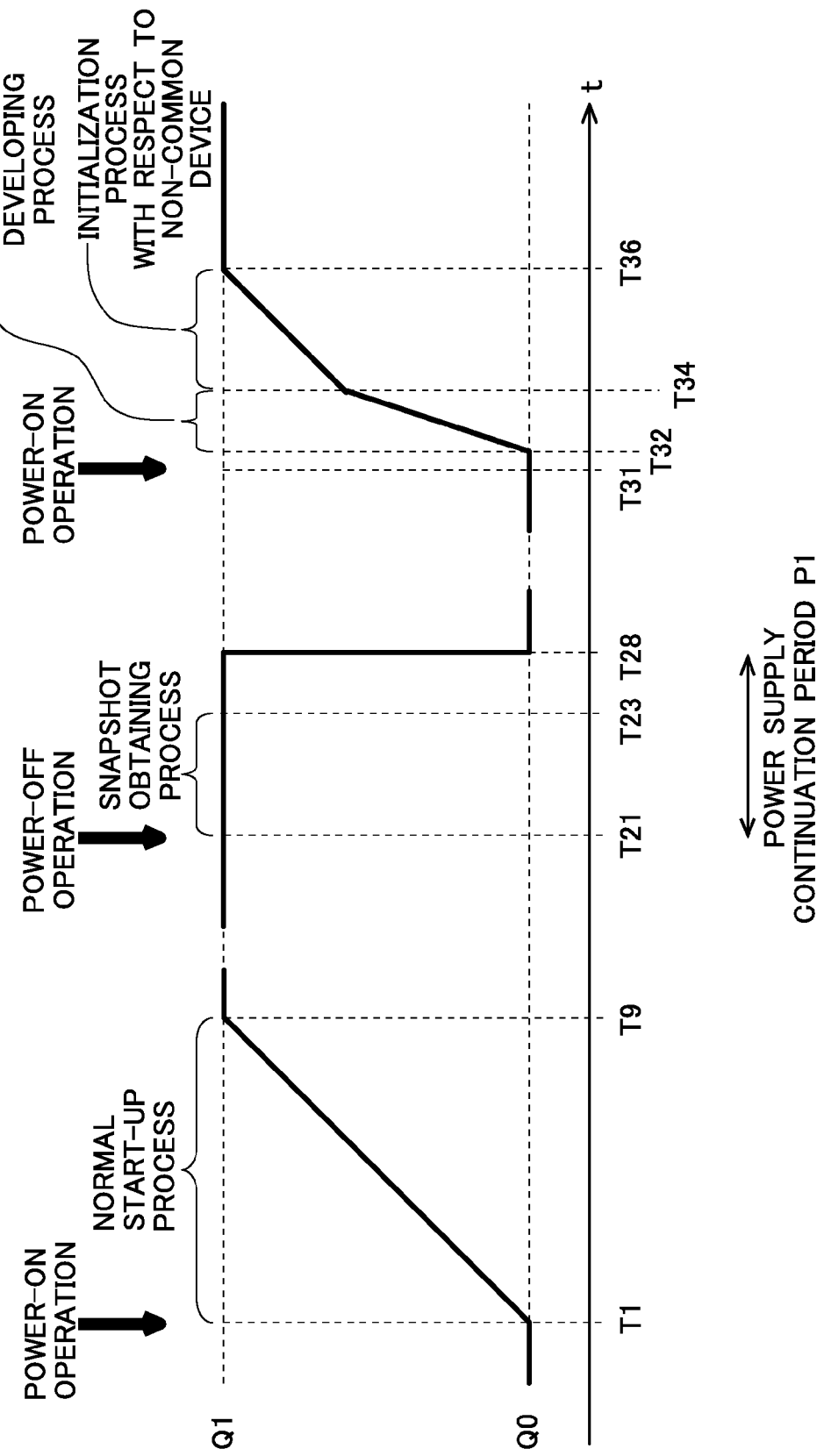

IMAGE FORMING APPARATUS WITH STARTUP CONTROLLER AND RECORDING MEDIUM

This application is based on Japanese Patent Application No. 2015-245838 filed on Dec. 17, 2015, the contents of which are hereby incorporated by reference.

BACKGROUND OF THE INVENTION

Field of the Invention

The present invention relates to an image forming apparatus such as an MFP (Multi-Functional Peripheral) and relates to technologies related to an image forming apparatus.

Description of the Background Art

There is an high-speed startup technique (also referred to as a hibernation startup technique) in which when a main power supply of an MFP is turned into an on-state, a user will be able to use functions of the MFP in a short time (refer to Japanese Patent Application Laid-Open No. 2014-10470, for example).

In the high-speed startup technique, supply of power is not stopped immediately in response to a turn-off operation of a main power switch, but a period for which power is continuously supplied even after the turn-off operation (such a period will be referred to as a power supply continuation period) is provided, so that a process to store device state information (also referred to as evacuation object information) is performed in the period. In more detail, as a preparation for the subsequent on-state of the main power switch, a process (also referred to as a snapshot obtaining process) is performed such that device state information (data in a RAM of a controller, data stored in resisters of processing units, and the like) at the time when the main power switch is turned into an off-state is stored in a nonvolatile storage. With this configuration, when the main power switch is subsequently turned into an on-state, the device state information (snapshot data) obtained in the immediately preceding snapshot obtaining process is used. By this operation, the MFP can be quickly returned to an activated state (in detail, a state (ready state) in which a job can be performed).

Meanwhile, various optional devices (for example, a finisher device, an authentication device, and the like) can be attached to and detached from an image forming apparatus.

Thus, even in the case where the above hibernation startup technique is applied, there is a possibility that an optional device is changed in a period between the power-off operation and the subsequent power-on operation. In other words, there is a possibility that a device configuration of the image forming apparatus is changed in a power-off period.

In the case where the device configuration of the image forming apparatus has been changed, if the snapshot data obtained at the time of the power-off operation is used at the time of the subsequent power-on operation, various problem can be caused by the inconsistency between the previous device configuration and the current device configuration. For example, when one optional device is detached from the image forming apparatus in the power-off period, the image forming apparatus tries to perform a restoration process of the snapshot data about the optional device immediately after the power-on operation. However, because the optional device is not attached, the restoration process will eventually fail (an error will occur).

Japanese Patent Application Laid-Open No. 2014-10470 describes a technique in which if it is determined that there is a change in optional components in an information processing device, a user is prompted, at the time of returning from a suspend state, to restart the information processing device. If that technique is applied to the above situation related to an image forming apparatus, it is possible to solve the above-described problem that an inconsistency occurs between the previous device configuration (optional components) and the current device configuration.

However, in the case where such a technique is applied, when it is determined, at the time of a power-on operation, that the device configuration of the image forming apparatus has been changed, an initialization process of the image forming apparatus is always performed; thus, the snapshot data are not used, whereby an effect of reducing a start-up time cannot be obtained at all.

SUMMARY OF THE INVENTION

An object of the present invention is to provide a technique in which even if the device configuration of the image forming apparatus has been changed in the period between a power-off operation and a subsequent power-on operation, it is possible to solve the problem caused by the inconsistency in the device configuration and to start up the image forming apparatus relatively quickly in response to the subsequent power-on operation.

A first aspect of the present invention provides an image forming apparatus including: a storage controller which obtains evacuation object information about the image forming apparatus from a volatile storage of the image forming apparatus and stores as snapshot data the evacuation object information in a nonvolatile storage of the image forming apparatus, in a power supply continuation period from a time of a power-off operation to a time of a power shutdown; a detector which detects, when a power-on operation has subsequently been performed after the power-off operation, presence or absence of a change related to a device configuration of the image forming apparatus, by comparing the device configuration of the image forming apparatus at the time of the power-off operation with the device configuration of the image forming apparatus at a time of the power-on operation; and a start-up controller which starts up, when the power-on operation has been performed, the image forming apparatus by using the snapshot data. In the above configuration, in a case where the power-on operation has been performed, regardless of the presence or absence of the change related to the device configuration of the image forming apparatus, the start-up controller performs a first snapshot developing process in which first partial data of the snapshot data are written back from the nonvolatile storage to the volatile storage, the first partial data being evacuation object information about a common device group in various device configurations. Further, in a case where the power-on operation has been performed and it is detected that there is no change related to the device configuration of the image forming apparatus, the start-up controller performs also a second snapshot developing process in which second partial data of the snapshot data are written back from the nonvolatile storage to the volatile storage, the second partial data being evacuation object information about a non-common device group whose presence or absence is changeable in the various device configurations.

A second aspect of the present invention provides a non-transitory computer-readable recording medium storing a program for causing a computer built in an image forming apparatus to perform a method including: (a) obtaining evacuation object information about the image forming apparatus from a volatile storage of the image forming apparatus and storing as snapshot data the obtained evacuation object information in a nonvolatile storage of the image forming apparatus, in a power supply continuation period from a time of a power-off operation to a time of a power shutdown; and (b) starting up, when a power-on operation has subsequently been performed after the power-off operation, the image forming apparatus by using the snapshot data. In the above method, the step (b) includes: (b-1) detecting, when the power-on operation has been performed, presence or absence of a change related to a device configuration of the image forming apparatus, by comparing the device configuration of the image forming apparatus at the time of the power-off operation with the device configuration of the image forming apparatus at a time of the power-on operation; (b-2) performing, in a case where the power-on operation has been performed, a first snapshot developing process, regardless of presence or absence of the change related to the device configuration of the image forming apparatus, the first snapshot developing process being performed in such a manner that first partial data of the snapshot data are written back from the nonvolatile storage to the volatile storage, the first partial data being evacuation object information about a common device group in various device configurations; and (b-3) performing also a second snapshot developing process, in a case where the power-on operation has been performed and it is detected that there is no change related to the device configuration of the image forming apparatus, the second snapshot developing process being performed in such a manner that second partial data of the snapshot data are written back from the nonvolatile storage to the volatile storage, the second partial data being evacuation object information about a non-common device group whose presence or absence is changeable in the various device configurations.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a timing chart showing an operation example, in the case where a device configuration is not changed, according to the second embodiment; and FIG. 11 is a timing chart of another operation example, in the case where the device configuration is changed, according to the second embodiment.

DESCRIPTION OF THE PREFERRED EMBODIMENTS

Hereinafter, embodiments of the present invention will be described with reference to the drawings.

1. First Embodiment

<1-1. Device Configuration>

Figure 1:
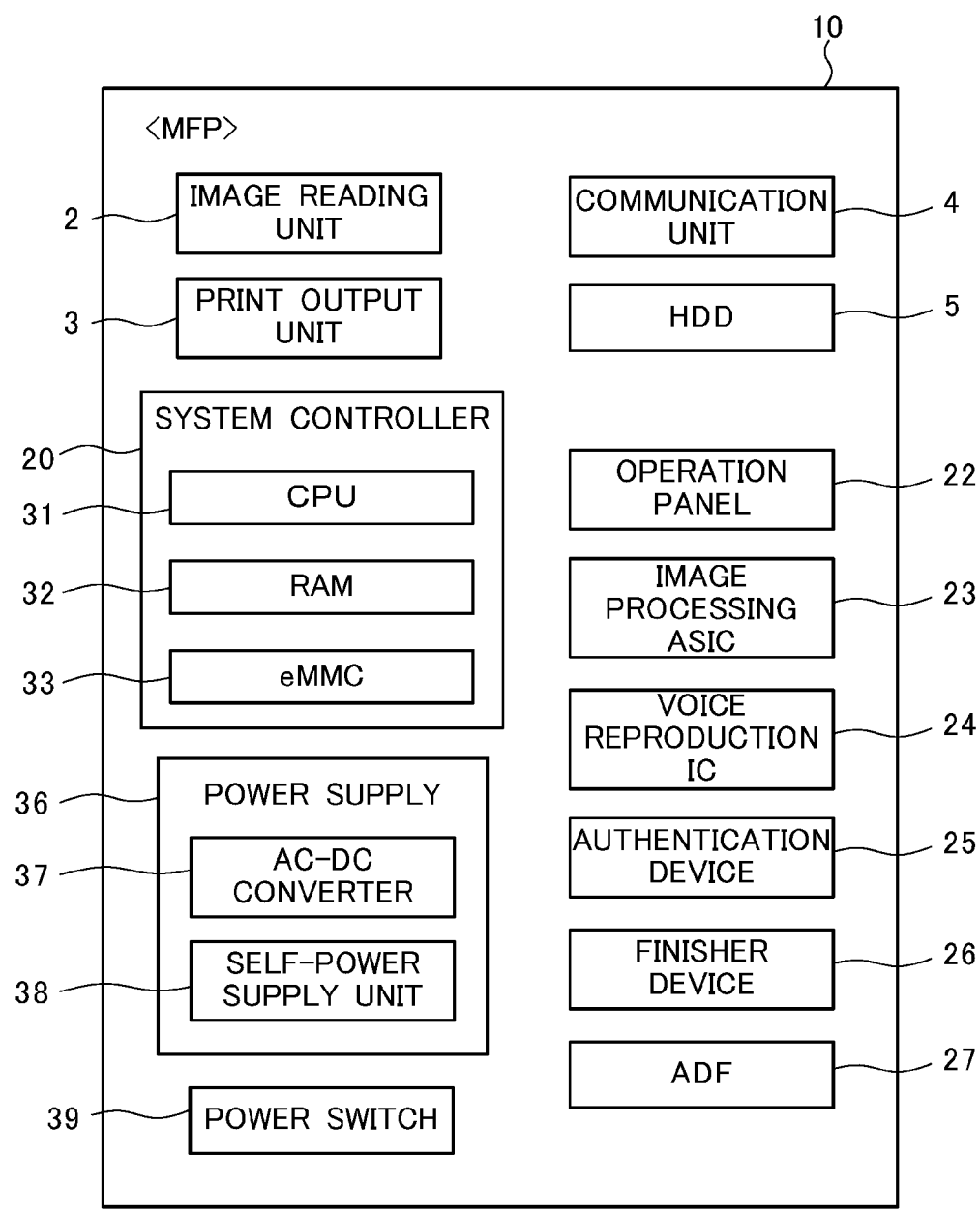
FIG. 1 is a diagram showing function blocks of an MFP (image forming apparatus)
Figure 2:
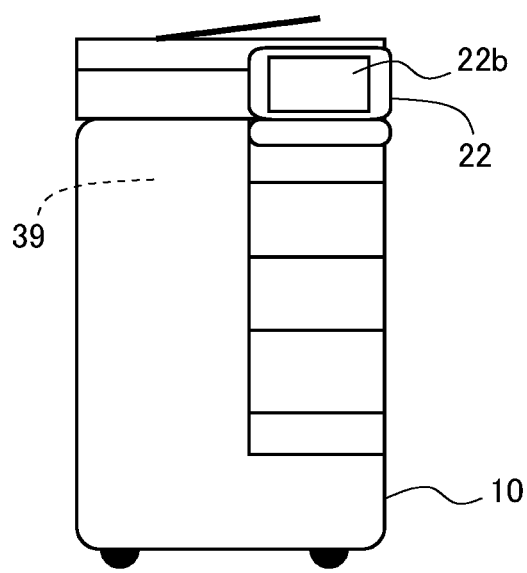
FIG. 2 is an outer appearance view of the MFP.

FIG. 1 is a diagram showing function blocks of an image forming apparatus 10. This description exemplifies an MFP (Multi-Functional Peripheral) as the image forming apparatus 10. Further, FIG. 2 is an outer appearance view of the MFP 10.

The MFP 10 is a device equipped with a scan function, a copy function, a facsimile machine function, a box storage function, and the like (the device is also referred to as a multi-functional peripheral). Specifically, as shown in the function block diagram of FIG. 1, the MFP 10 is equipped with an image reading unit 2, a print output unit 3, a communication unit 4, an HDD (Hard Disk Drive) 5, a system controller 20, an operation panel unit 22, an image processing ASIC 23, a voice reproduction IC 24, an authentication device 25, a power supply 36, and the like, and the MFP 10 realizes various functions by causing these units to operate complexly.

The image reading unit 2 is a processing unit which optically reads (in other word, scans) a document placed on a predetermined position on the MFP 10 to generate image data (also referred to as a document image or a scan image) of the document. The image reading unit 2 is also referred to as a scanning unit.

The print output unit 3 is an output unit which prints out an image on various media such as paper, based on data related to a print object.

The communication unit 4 is a processing unit which can perform facsimile communication through a public line or the like. Further, the communication unit 4 can also perform communication through a communication network (the communication is referred to as a network communication).

The HDD (Hard Disk Drive) 5 is a nonvolatile storage device (storage) having a relatively large capacity and can store large-volume data such as an image.

The operation panel unit 22 is an operation unit having a touch panel 22b on its front face side as shown in FIG. 2. The touch panel 22b is configured with a liquid crystal display panel having various sensors and the like buried therein, and the touch panel 22b can display various information and receive various operation inputs from an operator. In other words, the touch panel 22b is a display unit to display various information, and at the same time, is an operation input unit to receive an operation input from a user.

The image processing ASIC (Application Specific Integrated Circuit) 23 is an integrated circuit for image processing. The image processing ASIC 23 can perform various image processing (a γ adjustment process, a color adjustment process, an image compression process, and the like) on image data.

The voice reproduction IC 24 is an integrated circuit which controls a sound output. The voice reproduction IC 24 can perform sound output processing and the like of a guidance voice for a user.

The authentication device 25 is an authentication device (user authentication device) to be connected to a main body of the MFP 10 by a USB connection system or the like. As the authentication device 25, a device can be used which employs any of various user authentication methods, for example, a card authentication method, a vein authentication method, or the like.

A finisher device 26 is a device which performs finishing processes (a punching process, a stapling process, and the like) and which is used while connected to the main body of the MFP 10.

An auto document feeder (ADF) 27 is a device which automatically feeds a plurality of documents to the reading unit when the scanner is used.

The system controller 20 is a control device which is built in the MFP 10 and totally controls the MFP 10. The system controller 20 is configured as a computer system equipped with a CPU 31, various semiconductor memories (a volatile memory such as a RAM 32, and a nonvolatile memory such as an eMMC (embedded Multi Media Card) 33), and the like. The system controller 20 realizes various processing units by executing, on the CPU 31, a predetermined software program (hereinafter, simply referred to as a program as well) stored in the eMMC 33. Further, the program (in detail, a program module group) may be installed in the MFP 10 via a communication network. Alternatively, the program may be recorded in a portable recording medium (in other words, various non-transitory computer-readable recording media) such as a USB memory and be read out from the recording medium to be installed in the MFP 10.

Figure 3:
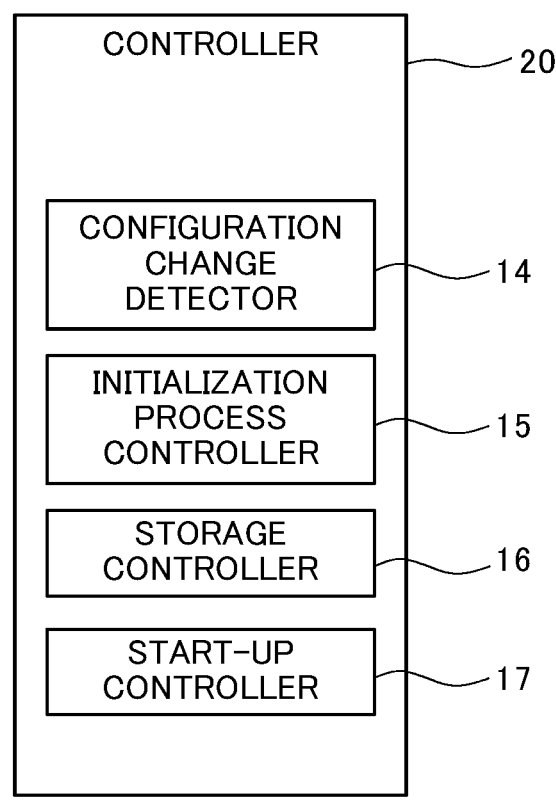
FIG. 3 is a diagram showing processing units realized by execution of a program.

Specifically, as shown in FIG. 3, the system controller 20 realizes various processing units including a configuration change detector 14, an initialization process controller 15, a storage controller 16, and a start-up controller 17, by executing the above program.

The configuration change detector 14 obtains each of the sets of information about the device configuration (including presence or absence of each of the optional devices and the like) of the MFP 10 at two timings which are immediately after a power-off operation and immediately after power-on operation, and the configuration change detector 14 compares the device configurations obtained at the two timings with each other. By this operation, the MFP 10 detects presence or absence of the change, in the power-off period, in the device configuration of the MFP 10. Note that the MFP 10 communicates with each optional device and obtains (recognizes) the device configuration of the MFP 10 at each of the timings by detecting the presence or absence of the connection to each optional device.

The initialization process controller 15 is a processing unit which performs an initialization process on each device of the MFP 10. As will be described later, the initialization process controller 15 initializes, for example, all or part of the plurality of devices of the image forming apparatus.

The storage controller 16 is a processing unit to obtain as snapshot data device usage information (which is information used by the apparatus 10 (including its devices)) of an processing unit (object device) which is an object of the snapshot obtaining process, and the storage controller 16 stores the device usage information in a nonvolatile storage (the eMMC 33, in this embodiment). The storage controller 16 obtains as the "snapshot data" the device usage information about each unit of the MFP 10 and stores the data in the eMMC 33 in a power supply continuation period P1 (to be described later) from the time of a power-off operation to the time of power shutdown. Note that the device usage information is also referred to as evacuation object information because the device usage information is object information of an evacuation process (to be described later).

The start-up controller 17 controls a start-up operation of the MFP 10. Specifically, the start-up controller 17 starts the MFP 10 quickly by using the snapshot data stored, in the eMMC 33 (nonvolatile storage), by the storage controller 16. At the time of the subsequent power-on operation after a power-off operation of the MFP 10, the start-up controller 17 performs a process (developing process) to develop (write back), on the MFP 10, all or part of the snapshot data obtained in the snapshot obtaining process immediately after the power-off operation.

Further, the MFP 10 is also provided with a main power switch 39 (see FIG. 1). The main power switch 39 (power switch) is a switch for switching between an on-state and an off-state of the MFP 10. The main power switch 39 is disposed, for example, on a main-body part (inside a cover), of the MFP 10, covered by an openable cover in order to prevent erroneous operations.

The power supply 36 can supply the respective units of the MFP 10 with electric power from an AC power source (in detail, electric power having been subjected to a conversion process by an AC-DC converter 37). Further, the power supply 36 can also supply the respective units of the MFP 10 with electric power accumulated in a self-power supply unit 38 (to be described below). The power supply 36 can switch appropriately between supply of power from the AC-DC converter 37 and supply of power from the self-power supply unit 38. For example, in an activated state of the MFP 10 or the like, the power supply 36 supplies the MFP 10 with electric power by using the AC-DC converter 37; and immediately after a turn-off operation of the main power switch 39 of the MFP 10, the power supply 36 supplies the MFP 10 with electric power by using the self-power supply unit 38 in the power supply continuation period P1 (to be described later). Further, the power supply 36 shuts the supply of electric power from the AC-DC converter 37 or the self-power supply unit 38 to the system controller 20 and the like of the MFP 10 by turning off an electromagnetic relay.

The self-power supply unit 38 is a rechargeable battery (DC power supply) configured with a capacitor having a relatively large capacitance and other components. The self-power supply unit 38 can supply the respective units of the MFP 10 with electric power accumulated until a time of power-off operation, in a predetermined period after the time of power-off operation.

<1-2. Operation>
<High-Speed Startup when Power is Turned on Again>

The MFP 10 employs a high-speed startup technique (also referred to as a hibernation startup technique) with which functions of the MFP can be used by a user in a short time when a power-on operation (also referred to as a main power-on operation or simply as a power-on operation) of the main power switch 39 has been performed.

In the high-speed startup technique, in a case where a turn-off operation (also referred to as a main power-off operation or simply a power-off operation) of the main power switch 39 has been performed, the evacuation process (storing process) of the device usage information (evacuation object information) is performed, in the power supply continuation period P1 after the time of the turn-off operation, as a preparation for when the main power switch 39 is subsequently put in an on-state. Specifically, a process (also referred to as a snapshot obtaining process) such that the evacuation object information (the data in the RAM 32 of the controller, the data in the resisters (and/or in the memories) of each processing unit, or other data) of the MFP 10 is stored (memorized) in a nonvolatile storage (the eMMC 33 or the like). In detail, the storage controller 16 obtains the device usage information about each object device (each hardware processing unit) from the volatile storage (the RAM 32 and the resister, the memory, and the like of each hardware processing unit) of the MFP 10 and stores the device usage information in the nonvolatile storage (the eMMC 33 or the like) of the MFP 10 as snapshot data. Then, when the main power switch 39 is subsequently put in an on-state, the data (snapshot data) obtained in the immediately preceding snapshot obtaining process from the nonvolatile storage (the eMMC 33 or the like) of the MFP 10 are written back (developed) in the volatile storage (the RAM 32 and the resister, the memory, and the like of each hardware processing unit) of the MFP 10. The write-back process (developing process) of the snapshot data is also referred to as a snapshot developing process. Using the snapshot data enables the MFP 10 to quickly return (quickly start) to a ready state Q1.

Figure 6:
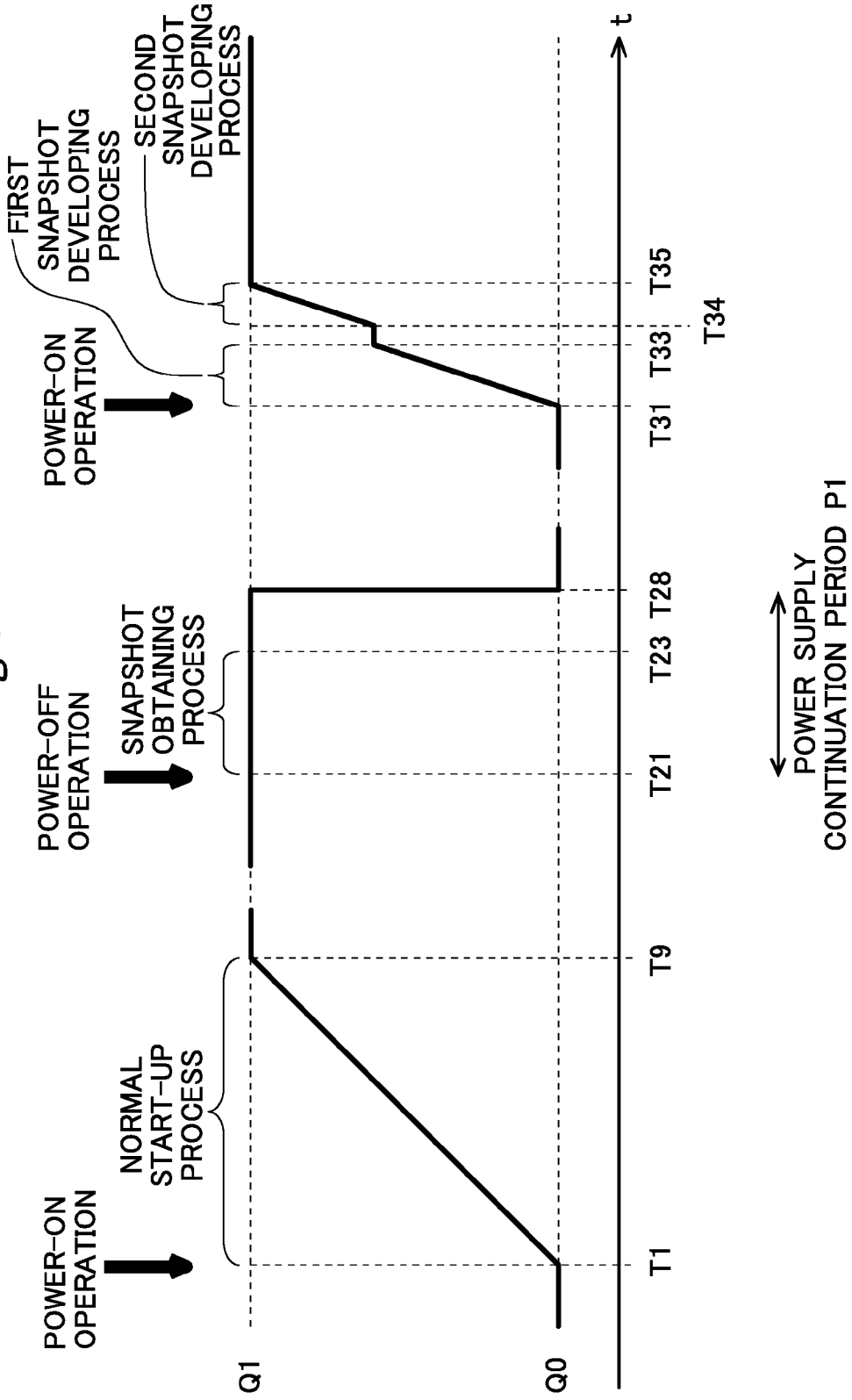
FIG. 6 is a timing chart showing an operation example in the case where a device configuration is not changed.
Figure 7:
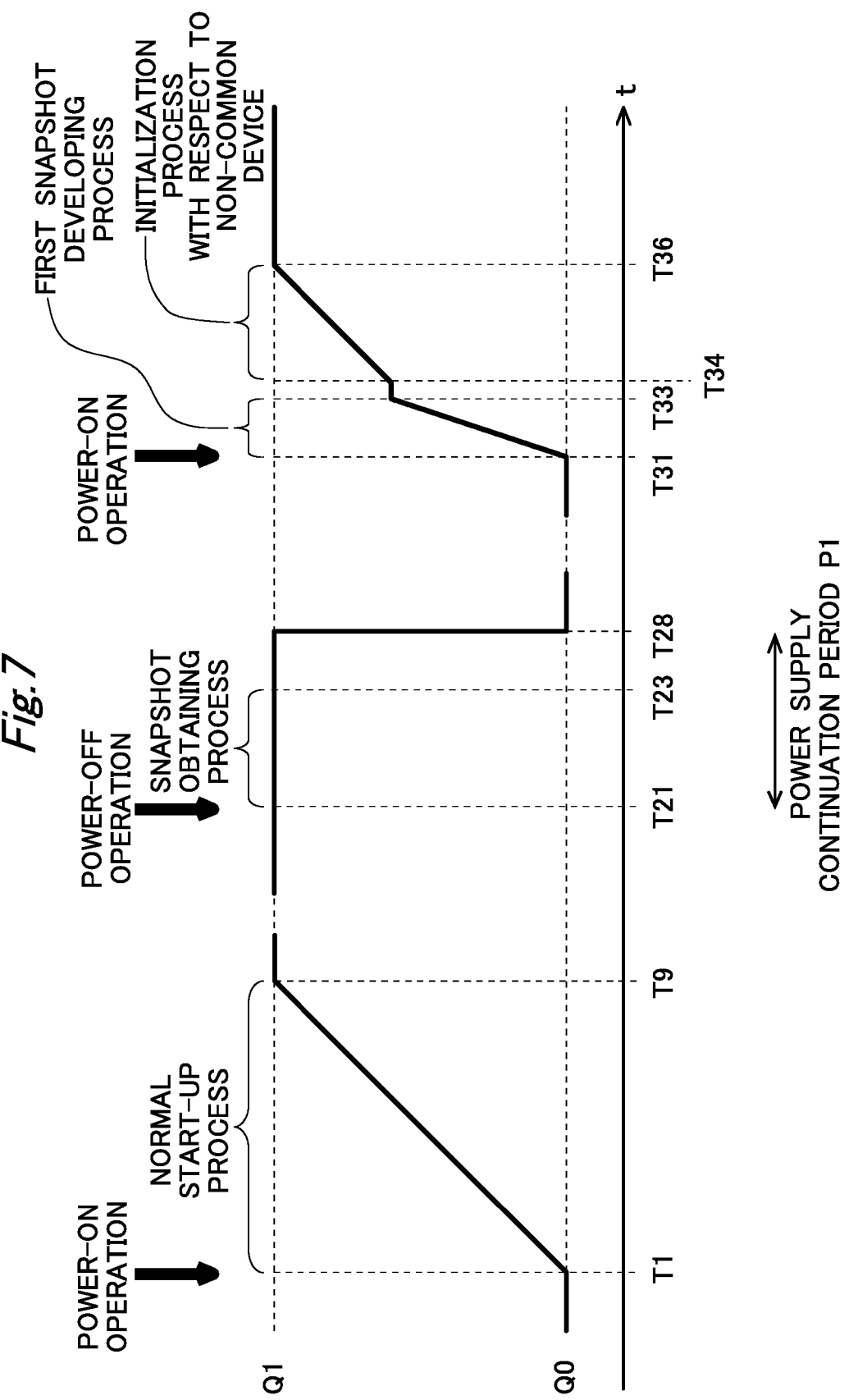
FIG. 7 is a timing chart showing another operation example in the case where the device configuration is changed.

Specifically, as shown in FIG. 6 and FIG. 7, in the power supply continuation period P1 from the time of power-off operation (power shut-off operation) (for example, from time T21) to time T28 of the power shutdown responding to the power-off operation, the MFP 10 stores the evacuation object information about the MFP 10 in the eMMC 33 (nonvolatile memory) as the snapshot data. Then, when a power-on operation subsequent to the power-off operation has been performed (time T31 and thereafter), the start-up time is reduced by using the snapshot data, and thus the MFP 10 starts up quickly.

<Snapshot Obtaining Process in Response to Power-Off Operation>

Figure 4:
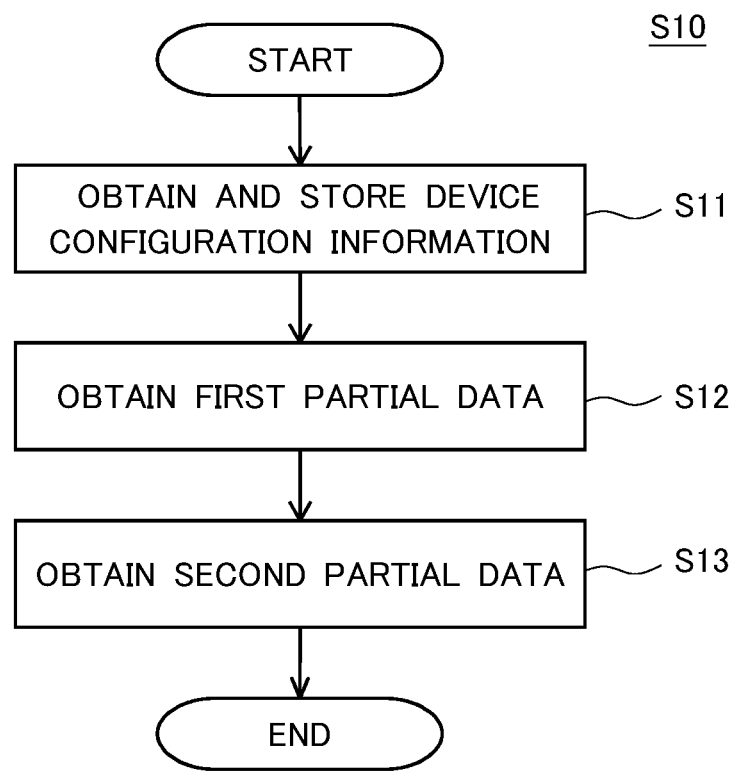
FIG. 4 is a flowchart of an operation when a power-off operation has been performed.
Figure 5:
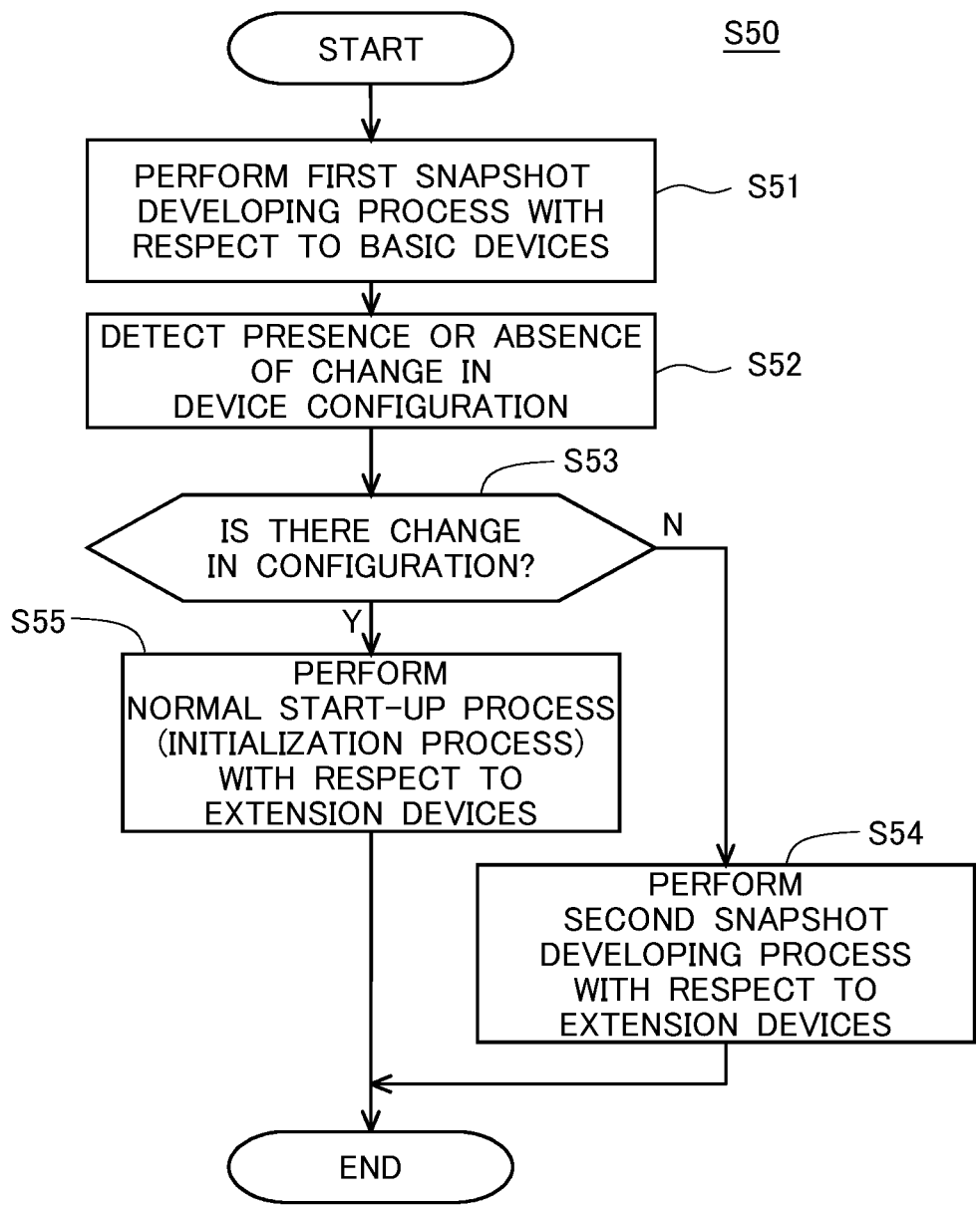
FIG. 5 is a flowchart of an operation when a power-on operation has been performed.

FIG. 4 is a flowchart showing an operation when a power-off (OFF) operation has been performed, and FIG. 5 is a flowchart showing an operation when a power-on (ON) operation has been performed. Further, FIG. 6 and FIG. 7 are timing charts showing operation examples and the like in which the power-off (OFF) operation is performed and the power-on (ON) operation is performed subsequently. Note that FIG. 6 shows an operation in the case where the device configuration at the time of power-on operation (T31) and the device configuration at the time of the immediately preceding power-off operation (T21) are identical. On the other hand, FIG. 7 shows an operation in the case where the device configuration at the time of power-on operation (T31) and the device configuration at the time of the immediately preceding power-off operation (at T21) are different from each other.

Hereinafter, a description will be first given, with reference to the drawings, on an operation when a power-off operation has been performed.

As shown in FIG. 6 and FIG. 7, when a power-on operation is performed at time T1 and a normal start-up process is then performed, the MFP 10 transits from a power-off state Q0 to an activated state (in more detail, a ready state Q1 (standby state)) (at time T9 or the like).

After that, when a power-off operation by the main power switch 39 is received in the ready state Q1 (at time T21), the MFP 10 performs an operation shown in FIG. 4 (step S10).

Specifically, first, in step S11, device configuration information (the information representing the device configuration of the MFP 10) at the time of power-off operation is obtained. For example, the MFP 10 previously communicates with the connected optional devices to identify a device type (for example, a device type ID) and the like of each optional device, and previously stores the identified result in a volatile storage (the RAM 32 or the like). In step S11, by reading out the stored information from the device storing the information, the device configuration of the MFP 10 at the time of power-off operation (T21) is obtained (recognized), and the read out information is stored in the nonvolatile storage (the eMMC 33, the HDD 5, or the like).

Figure 8:
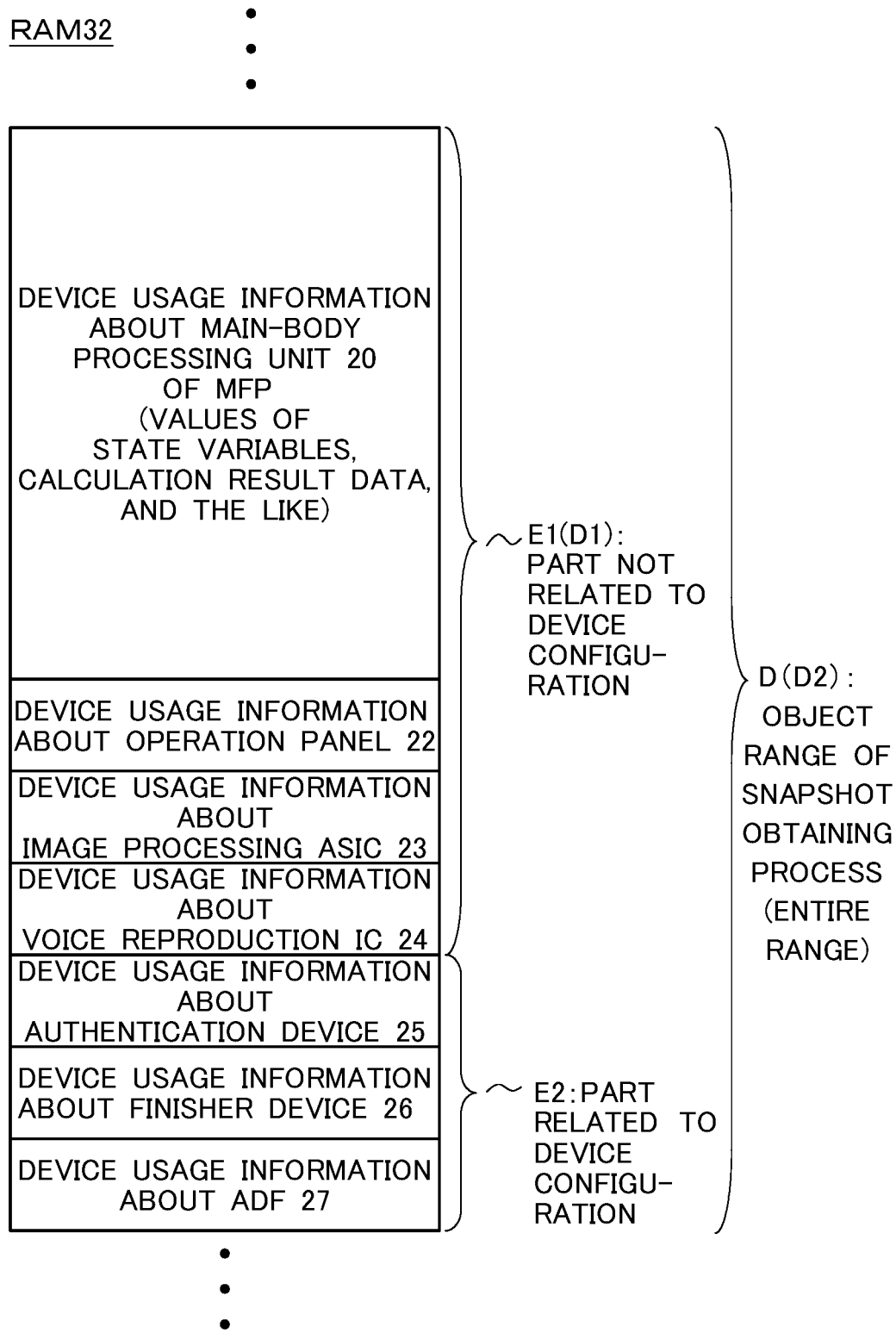
FIG. 8 is a diagram showing a memory map of a RAM of the MFP.

Next, in steps S12 and S13, the MFP 10 performs a snapshot obtaining process (from time T21 to time T23 (see FIG. 6 and FIG. 7)). Specifically, the MFP 10 obtains as snapshot data D the evacuation object information about a plurality of devices and stores the snapshot data D in the eMMC 33 (the nonvolatile memory). The snapshot data D are constituted by two sets of partial data E1 and E2 (see FIG. 8). FIG. 8 is a diagram showing a part of a memory map related to the RAM 32. Note that, in the present embodiment, of a plurality of devices 20 and 22 to 27 which can be objects of the snapshot obtaining process, the devices 20 and 22 to 24 constitute a common device group (to be described later), and the devices 25 to 27 constitute a non-common device group (to be described later).

In detail, first, in step S12, the first partial data E1 of the two sets of partial data E1 and E2 are obtained as a part of the snapshot data and are stored in the eMMC 33. The first partial data E1 are configured to include the evacuation object information about a first device group (the common devices 20 and 22 to 24 (see FIG. 8 and the like), which are not related to the change in the device configuration). The first device group is a core device group (which is a group of devices commonly existing in various device configurations (a group of devices whose presence or absence is not changed in various device configurations)) which is not related to the change in the configuration of the optional devices and is also expressed as a basic device group. Further, the first partial data E1 are expressed as partial data which are not related to the change in the device configuration.

In more detail, for example, as shown in FIG. 8, the first partial data E1 include the data (the device usage information (the evacuation object information)) which are stored in the RAM 32 or the like and which are used by the system controller 20 (also referred to as a main-body processing unit) of the MFP 10. For example, the evacuation object information (that is, the first partial data E1) includes a value of a state variable representing the optional components and the like of the MFP 10 and image data or the like to which the optional components are reflected. The evacuation object information in the system controller 20 of the MFP 10 is transferred from the RAM 32 or the like to the eMMC 33 and is stored.

Further, for example, the first partial data E1 also include the evacuation object information (the device usage information (the data used by the respective devices 22 to 24 (the data are the values or the like of the state variables))) about the devices 22 to 24 (the hardware processing units (basic hardware processing units)). The evacuation object information (the data and the like in the resisters (and/or the memories) of the hardware processing units) about the respective devices (the hardware processing units) 22 to 24 is once copied (transferred and stored) in the RAM 32 from the respective hardware processing units, and is then further transferred to the eMMC 33 and stored. More specifically, the MFP 10 once develops on the RAM 32 the information (image adjustment parameters (γ value and the like)) stored in the resister in the image processing ASIC 23, in the memory in the image processing ASIC 23, and in other places, and stores the data having been developed on the RAM 32 in the eMMC 33. A similar operation is performed on the information in the resister in the voice reproduction IC 24, the information in the memory in the voice reproduction IC 24, and other information. Further, in a similar manner, the MFP 10 once develops on the RAM 32 the information (screen data of a display screen, a screen ID of the display screen, and information representing lighting states and the like of various LEDs) stored in the resister, the memory, and the like in the operation panel unit 22, and stores the data having been developed on the RAM 32 in the eMMC 33.

Next, in step S13, the second partial data E2 of the two sets of partial data are obtained as the other part of the snapshot data D and are stored in the eMMC 33. The second partial data E2 are configured to include the evacuation object information about the second device group (the devices 25 to 27 (see FIG. 8 and the like), which can be related to the change in the device configuration). The second device group is a non-core device group (devices whose presence or absence is changeable in various device configurations) which can be related to the change in the configuration of the optional devices, and the second device group can be expressed as a non-basic device (non-common device or extension device) group. Further, the second partial data E2 can be expressed as partial data related to the change in the device configuration. The second partial data E2 can be also expressed as the partial data of the snapshot data D other than the first partial data E1.

In more detail, for example, as shown in FIG. 8, the second partial data E2 include the evacuation object information (the device usage information (the data used by the respective devices 25 to 27 (the data and the like related to various calculation results))) about the devices 25 to 27 (also referred to as hardware processing units (extended hardware processing units) or the like). The evacuation object information (the data and the like in the resisters (and/or the memories) of the hardware processing units) about the respective devices (the hardware processing units) 25 to 27 is once copied (transferred and stored) in the RAM 32 from the respective hardware processing units and is then further transferred to the eMMC 33 and stored.

Note that, the first partial data E1 and the second partial data E2 only have to be distinguishable in the snapshot data D by various methods. For example, the various information in the snapshot data D may be stored with flag information indicating which of the first partial data E1 and the second partial data E2 each information is. Alternatively, it is also possible to store the information indicating a storage position (memory address) of the first partial data E1 and the information indicating a storage position (memory address) of the second partial data E2 together with the partial data E1 and E2.

As described above, when the power-off operation by the main power switch 39 has been performed, a process (snapshot obtaining process) is performed such that the evacuation object information about the MFP 10 is stored (evacuated) in the nonvolatile storage (the eMMC 33). That is, the obtaining process of the snapshot data (an evacuation process of the evacuation object information) is performed.

Note that, after the power-off operation, the supply of power is not shut down immediately, but the power is kept supplied during the power supply continuation period P1. Specifically, at the time of power-off operation (time T21), the supply of power from the AC power source is switched to the supply of power from the self-power supply unit 38, so that the supply of power continues during the power supply continuation period P1 from time T21 to time T28 (see FIG. 6 and FIG. 7). The self-power supply unit 38 supplies the respective units of the MFP 10 with electric power accumulated until the time of power-off operation T21, during a period (also referred to as a "power supply continuation period") from the time of power-off operation T21 (to time T28). The power supply continuation period P1 is, for example, some seconds to some tens of seconds. Note that the power supply continuation period P1 may be a predetermined value (a fixed value) or may be a value to be changed in view of various factor (a variable value).

Then, at time T28, after the power supply continuation period P1 (for example, a predetermined period) has elapsed since time T21, the supply of power by the self-power supply unit 38 is shut (the voltage falls).

<Operation after Power-on Operation>

Next, the operation after the power-on operation will be described with reference to FIG. 5.

When the power-on operation (the power-on operation subsequent to the power-off operation (time T21)) is performed again by the main power switch 39 at time T31, the MFP 10 performs a developing process to develop the snapshot data stored in the eMMC 33. That is, the MFP 10 quickly starts up the MFP 10 itself by using the snapshot data.

Specifically, the MFP 10 returns (transferred) the snapshot data (the evacuation object information) previously evacuated (stored) in the eMMC 33, to the RAM 32. Further, the MFP 10 returns the evacuation object information of the object devices (devices 20, 22 to 24 and the like) of the developing process from the RAM 32 to the corresponding hardware devices (the resister, the memory, or the like in respective devices). The above developing process returns the main-body part (device 20) and the devices 22 to 24 of the MFP 10 to the state at the time (T21) of the immediately preceding power-off operation.

In the present embodiment, the developing process of the snapshot data is performed roughly in two steps. One is the developing process of the first partial data E1, and the other is the developing process of the second partial data E2. However, as will be described later, the developing process of the second partial data E2 is performed only when the device configuration of the MFP 10 has not been changed in the immediately preceding power-off period, and is not performed when the device configuration of the MFP 10 has been changed in the immediately preceding power-off period.

Specifically, first, in step S51, a process (the first snapshot developing process) is performed with respect to the first device group (the common device group) such that the first partial data E1 are developed (time T31 to time T33 (see FIG. 6 and FIG. 7)). For example, the evacuation object information about the first device group (the devices 20 and 22 to 24 (see FIG. 8 and the like)) is once stored (developed) in the RAM 32 and is further stored (developed) in the resisters, the memories, and the like of the devices of the first device group.

In the subsequent step S52, the MFP 10 determines whether the device configuration of the MFP 10 has been changed in the power-off period (time T33 to time T34 (see FIG. 6 and FIG. 7)).

Specifically, the MFP 10 first communicates with the connected optional devices to recognize the device types (for example, device type IDs) and the like of the optional devices, thereby obtaining (recognizing) the device configuration of the MFP 10 at the time of power-on operation (T31). Then, it is determined whether the device configuration at the time of power-on operation (T31) and the device configuration at the time of the immediately preceding power-off operation (T21) are identical. In more detail, a comparison is made between the device configuration information obtained in step S11 in response to the immediately preceding power-off operation (T21) and the device configuration information obtained in step S52 in response to the power-on operation (T31) subsequent to the power-off operation. Based on the comparison result, whether a change was made with respect to the device configuration of the MFP 10 in the power-off period, in other words, the presence or absence of the change in the device configuration is detected. For example, in a case where the finisher device 26 has been removed from the MFP 10 in the power-off period, it is determined that there is a change in the device configuration.

In step S53, a branching process is performed depending on the presence or absence of the change in the device configuration of the MFP 10. If it is determined that the device configuration has not been changed, the process proceeds to step S54. On the other hand, if it is determined that the device configuration has been changed, the process proceeds to step S55.

In step S54, as shown also in FIG. 6, the second snapshot developing process (the process for developing the second partial data) is performed with respect to the second device group (extension device group) (time T34 to time T35). For example, the evacuation object information about the second device group (devices 25 to 27 (see FIG. 8 and the like)) is once stored (developed) in the RAM 32, and is stored (developed) in the resisters, the memories, and the like of the devices of the second device group.

Note that by a restoring operation using snapshot data, the MFP 10 can be started quicker than in the case where the snapshot data are not used (the case where a normal initialization process is performed after a power-on operation).

For example, with respect to the image processing ASIC 23, an setting process is performed in the initialization process, and in the setting process, an arithmetic process is performed such that, for example, values of many variables (parameters) representing various types of states are calculated by using a system controller 9 on the basis of the information specified by a user, and in addition, the variables are set to the values related to the results of the arithmetic process. On the other hand, in the developing process in the period from time T31 to time T33, the initialization process is not performed, and as a result, the arithmetic process included in the initialization process is not performed, either. In the developing process in the period from time T31 to time T33, the information (the information stored (evacuated) in the eMMC 33) obtained in the snapshot obtaining process (time T22 to time T23) is stored (developed) in the RAM 32 and in the resisters, the memories, and the like in the image processing ASIC 23. Therefore, compared with the case where the initialization process including the arithmetic process is performed after the power-on operation (time T31), the image processing ASIC 23 can shift its state to a normally usable state (a state in which normal use is possible) relatively quickly.

Further, with respect to the operation panel unit 22, in the initialization process, arithmetic processes are performed such as generating display image data by using the system controller 9 on the basis of a size of a display panel (pixel number information), and in addition, setting process are also performed such as storing the data (image data) related to the results of the arithmetic process in the memory or the like in the operation panel unit 22. On the other hand, in the developing process in the period from time T31 to time T33, the initialization process is not performed, and as a result, the arithmetic process included in the initialization process is not performed, either. In the developing process in the period from time T31 to time T33, the information (the information stored (evacuated) in the eMMC 33) obtained in the snapshot obtaining process (time T22 to time T23) is stored (developed) in the RAM 32 and in the resisters, the memories, and the like in the operation panel unit 22. Therefore, compared with the case where the initialization process including the arithmetic process is performed again after the power-on operation (time T31), the operation panel unit 22 can shift its state to a normally usable state (a state in which normal use is possible) relatively quickly.

Note that, with respect to the other devices 20, 24 to 27 and the like, similar effects can be obtained.

On the other hand, in step S55, as shown also in FIG. 7, the initialization process is performed with respect to the extension devices (the non-common devices) instead of the second snapshot developing process (time T34 to time T36). In this case, the snapshot data are not used with respect to the non-common devices 25 to 27; therefore, the start-up is performed at a normal start-up speed (slower than the second snapshot developing process) with respect to the non-common devices 25 to 27. However, no problem arises in the power-off period, such as inconsistency of the data due to the change (the change in the device configuration) in the mounted devices; thus, no error or the like due to the inconsistency occurs. Therefore, no delay, in the processing time, associated with error occurrence occurs, and it is also possible to avoid problem occurrence due to inconsistency.

As described above, in the case where it is detected, when the power-on operation is performed (time T31), that there is no change related to the device configuration of the MFP 10, the first snapshot developing process is performed using the first partial data E1 of the snapshot data, and the second snapshot developing process is performed using the second partial data E2 of the snapshot data. On the other hand, in the case where it is detected, when the power-on operation is performed (time T31), that there is a change related to the device configuration of the MFP 10, the first snapshot developing process is performed using the first partial data E1 of the snapshot data, and the initialization process is performed with respect to all of the devices 25 to 27 with respect to which the device configuration can be changed.

By the above operation, when the subsequent power-on operation (time T31) is performed after the power-off operation (time T21), regardless of presence or absence of a change in the device configuration of the MFP 10, the first snapshot developing process (step S51) is performed using the first partial data E1 (the evacuation object data about the common device group) of the snapshot data (time T31 to time T33 (see FIG. 6 and FIG. 7)). The first snapshot developing process with respect to the common device group is completed in a shorter time than the initialization process with respect to the common device group. Therefore, in the case where there is a change related to the device configuration of the MFP 10, it is possible to start up the image forming apparatus more quickly, compared with the technique in which an initialization process (restart process) is performed with respect to all the devices (for example, the devices 20 and 22 to 27).

Further, if it is detected, when the power-on operation (time T31) is performed, that there is no change related to the device configuration, the second snapshot developing process (the snapshot developing process using the second partial data E2, of the snapshot data, related to the change in the device configuration) is also performed (steps S53 and S54). In other words, in the case where it is detected that there is a change related to the device configuration, the second snapshot developing process using the second partial data E2 is not performed (see FIG. 6). Therefore, it is possible to avoid the problem due to inconsistency of the device configuration.

Further, if it is detected, when the power-on operation (time T31) is performed, that there is no change related to the device configuration, the second snapshot developing process is performed using the second partial data E2 (time T34 to time T35 (see FIG. 6)). Therefore, in the case where there is no change related to the device configuration, it is possible to start up the image forming apparatus more quickly.

As described above, also in the case where the device configuration of the image forming apparatus has been changed in the period between the power-off operation and the subsequent power-on operation, it is possible to start up the image forming apparatus relatively quickly in response to the subsequent power-on operation while avoiding a problem due to inconsistency of the device configuration.

2. Second Embodiment

In the above first embodiment, as shown in FIG. 5 and the like, a device-configuration-change detection process (step S52) is performed after the first snapshot developing process (step S51) is performed; however, the present invention is not limited to that order. For example, in the opposite order, the first snapshot developing process (step S51) may be performed after the device-configuration-change detection process (step S52) is performed. In the second embodiment, such an aspect will be described.

The second embodiment is an modified example of the first embodiment. In the following, the difference from the first embodiment will be mainly described with reference to FIG. 9 and the like. Note that FIG. 9 is a flowchart showing an operation according to the second embodiment.

Figure 9:
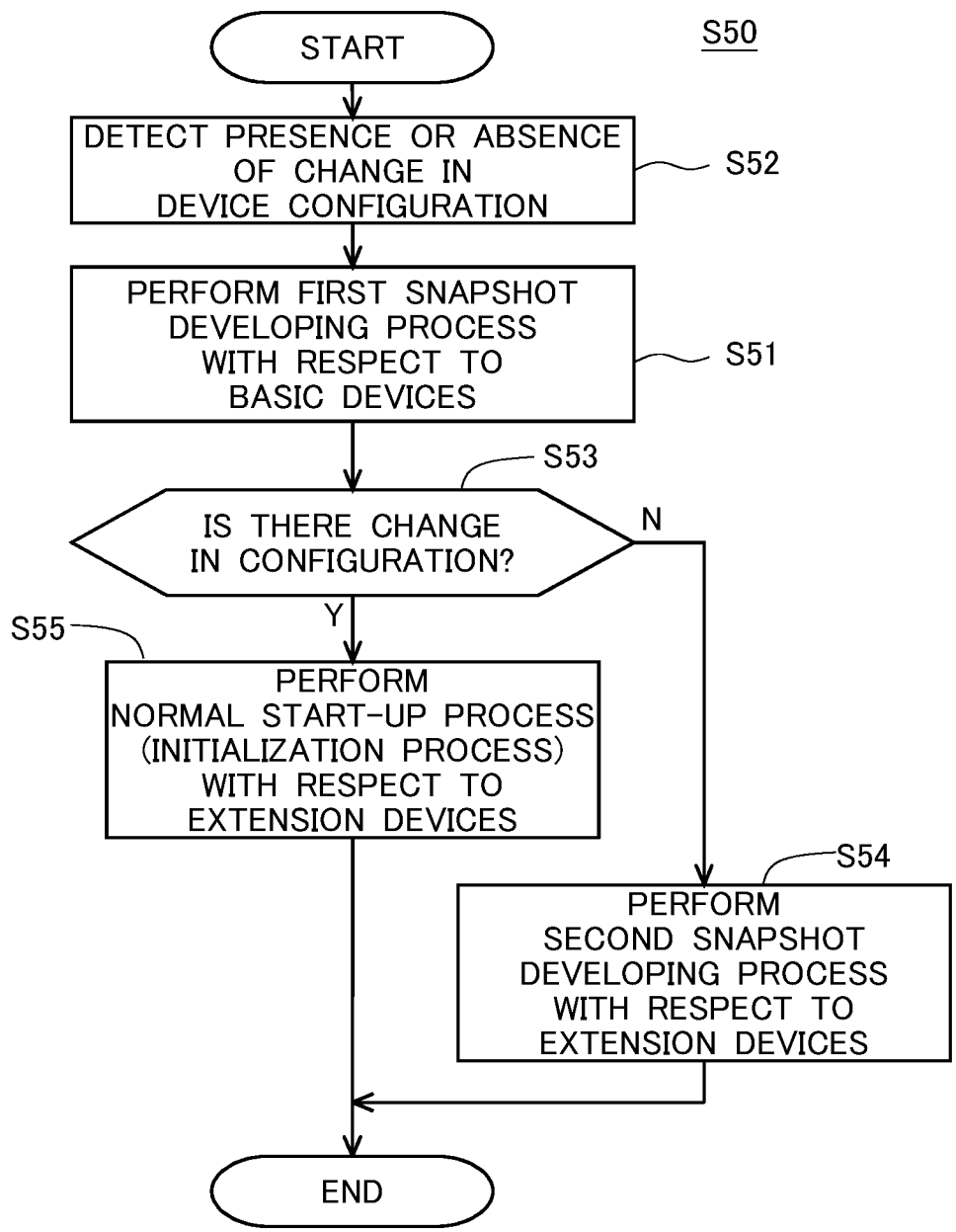
FIG. 9 is a flowchart showing an operation according to a second embodiment.

As shown in FIG. 9, in the second embodiment, the device-configuration-change detection process (step S52) is first performed (time T31 to time T32 in FIG. 10), and after that, the first snapshot developing process (step S51) is performed (time T32 to time T34 (FIG. 10)). Further, after that, it is determined, based on the detection result in step S52, which of steps S54 and S55 is to be performed.

If a change in the device configuration is not detected in the device-configuration-change detection process (step S52), the first snapshot developing process using the first partial data E1 (step S51) and the second snapshot developing process using the second partial data E2 (step S54) are performed. In other words, the snapshot developing process is performed using the snapshot data D including both of the first partial data E1 and the second partial data E2. For example, as shown in FIG. 10, the first snapshot developing process is performed from time T32 to time T34, and the second snapshot developing process is performed from time T34 to time T35. Note that the first partial data E1 and the second partial data E2 do not have to be developed in this order, and the snapshot developing process may be performed with the first partial data E1 and the second partial data E2 being mixed (in random order) from time T32 to time T35.

On the other hand, if a change in the device configuration is detected in the device-configuration-change detection process (step S52), the first snapshot developing process using the first partial data E1 (step S51) is performed, but the second snapshot developing process (step S54) using the second partial data E2 is not performed. Instead of the second snapshot developing process using the second partial data E2, the initialization process (step S55) with respect to the extension devices (the non-common devices) is performed (time T34 to time T36).

The above-described aspect can provide the same effect as the first embodiment.

3. Modified Example and the Like

The embodiments of the present invention are described above; however, the content of the above description does not limit the present invention.

For example, the above embodiments exemplify the devices 20 and 22 to 24 as common devices (basic devices) and the devices 25 to 27 as non-common devices (extension devices); however, the above configuration does not limit the present invention. Specifically, a fax unit may be provided as a non-common device (an extended hardware processing unit), and the evacuation object information about the fax unit may be included in the second partial data E2. Alternatively, to the contrary, a fax unit may be provided as a common device (a basic hardware processing unit), and the evacuation object information about the fax unit may be included in the first partial data E1. Further, other various devices may be provided as common devices or non-common devices.

Each of the above embodiments exemplifies an aspect in which each device group is configured with a plurality of devices; however, the present invention is not limited to the above aspect, and each device group (for example, the second device group) may be configured with a single device.

Further, each of the above embodiments exemplifies an aspect in which a set of data including two partial data E1 and E2 are obtained as the snapshot data D; however, the present invention is not limited to the above aspects, and two sets of data may be obtained as the snapshot data D.

For example, it is also possible to obtain as the snapshot data D the first data D1 and the second data D2 respectively constituted by the data corresponding to the first partial data E1 and the data corresponding to the second partial data E2. In other words, it is possible to obtain the first data D1 as the first partial data of the snapshot data D and to obtain the second data D1 as the second partial data of the snapshot data D.

Specifically, the MFP 10 obtains as the first data D1 the evacuation object information about the first device group (the common devices 20 and 22 to 24 (see FIG. 8 and the like), which are not related to the change in the device configuration), and stores the first data D1 in the eMMC 33. Further, the MFP 10 obtains as the second data D2 the evacuation object information about the second device group (the devices 25 to 27 (see FIG. 8 and the like), which are related to the change in the device configuration), and stores the second data D2 in the eMMC 33. As described above, the MFP 10 may obtain two sets of data, the first data D1 and the second data D2, as the snapshot data D, in response to the power-off operation. Further, in the operation (step S50) immediately after the subsequent power-on operation, the data D1 and D2 may be used appropriately depending on the presence or absence of a change, in the device configuration, in the power-off period. Specifically, if there is no change in the device configuration, the both of the data D1 and D2 may be used to perform the snapshot developing process. Alternatively, if there is a change in the device configuration, only the data D1 of the both data may be used to perform the snapshot developing process, and the initialization process with respect to the non-common device may be performed (step S55).

Alternatively, it is also possible to obtain as the snapshot data D the first data D1 constituted by the data corresponding to the first partial data E1 and the second data D3 constituted by both of the data corresponding to the first partial data E1 and the data corresponding to the second partial data E2.

In this case, in the operation (step S50) immediately after the subsequent power-on operation, the data D1 and D3 may be used appropriately depending on the presence or absence of a change in the device configuration in the power-off period. Specifically, if there is no change in the device configuration, the data D3 may be used to perform the first snapshot developing process and the second snapshot developing process. In other words, a part of the second data D3 may be used as the first partial data of the snapshot data D, and the other part of the second data D3 may be used as the second partial data of the snapshot data D. Alternatively, if there is a change in the device configuration, only the data D1 may be used to perform the first snapshot developing process, and the initialization process with respect to the non-common devices may be performed (step S55). In other words, the first data D1 may be used as the first partial data of the snapshot data D.

While the invention has been shown and described in detail, the foregoing description is in all aspects illustrative and not restrictive. It is therefore understood that numerous modifications and variations can be devised without departing from the scope of the invention.

What is claimed is:

1. An image forming apparatus comprising:
    a storage controller which obtains evacuation object information about the image forming apparatus from a volatile storage of the image forming apparatus and stores as snapshot data the evacuation object information in a nonvolatile storage of the image forming apparatus, in a power supply continuation period from a time of a power-off operation to a time of a power shutdown;
    a detector which detects, when a power-on operation has subsequently been performed after the power-off operation, presence or absence of a change related to a device configuration of the image forming apparatus, by comparing the device configuration of the image forming apparatus at the time of the power-off operation with the device configuration of the image forming apparatus at a time of the power-on operation; and
    a start-up controller which starts up, when the power-on operation has been performed, the image forming apparatus by using the snapshot data,
    when the power-on operation has been performed, the start-up controller performs a first snapshot developing process in which first partial data of the snapshot data are written back from the nonvolatile storage to the volatile storage, the first partial data being evacuation object information about a common device group in various device configurations, and when it is detected that there is no change related to the device configuration of the image forming apparatus, the start-up controller performs also a second snapshot developing process in which second partial data of the snapshot data are written back from the nonvolatile storage to the volatile storage, the second partial data being evacuation object information about a non-common device group whose presence or absence is changeable in the various device configurations.

2. The image forming apparatus according to claim 1, when the power-on operation has been performed and it is detected that there is a change related to the device configuration of the image forming apparatus, the start-up controller does not perform the second snapshot developing process with respect to the non-common device group and performs an initialization process with respect to the non-common device group.

3. The image forming apparatus according to claim 1, when the power-on operation has been performed, after the start-up controller performs the first snapshot developing process with respect to the common device group, the detector detects the presence or absence of the change related to the device configuration of the image forming apparatus,
    when a detection result showing that there is no change related to the device configuration of the image forming apparatus is obtained by the detector, the start-up controller performs also the second snapshot developing process with respect to the non-common device group, and
    when a detection result showing that there is a change related to the device configuration of the image forming apparatus is obtained by the detector, the start-up controller does not perform the second snapshot developing process with respect to the non-common device group and performs an initialization process with respect to the non-common device group.

4. The image forming apparatus according to claim 1, when the power-on operation has been performed, after a detection result showing that there is no change related to the device configuration of the image forming apparatus is obtained by the detector, the start-up controller performs the first snapshot developing process with respect to the common device group and performs also the second snapshot developing process with respect to the non-common device group; and
    when the power-on operation has been performed, after a detection result showing that there is a change related to the device configuration of the image forming apparatus is obtained by the detector, the start-up controller performs the first snapshot developing process with respect to the common device group and an initialization process with respect to the non-common device group.

5. The image forming apparatus according to claim 1, wherein in the power supply continuation period starting from the time of the power-off operation, the storage controller obtains, as the snapshot data, data including the first partial data and the second partial data, and stores the obtained data in the nonvolatile storage.

6. The image forming apparatus according to claim 1, wherein in the power supply continuation period starting from the time of the power-off operation, the storage controller obtains, as the snapshot data, first data corresponding to the first partial data and second data corresponding to the second partial data, and stores the first data and the second data in the nonvolatile storage.

7. The image forming apparatus according to claim 1, wherein in the power supply continuation period starting from the time of the power-off operation, the storage controller obtains, as the snapshot data, first data corresponding to the first partial data and second data corresponding to both of the first partial data and the second partial data, and stores the first data and the second data in the nonvolatile storage, and
    in a case where the power-on operation has been performed and it is detected that there is no change related to the device configuration of the image forming apparatus, the start-up controller performs the first snapshot developing process and the second snapshot developing process by using the second data.

8. A non-transitory computer-readable recording medium storing a program for causing a computer built in an image forming apparatus to perform a method comprising:
(a) obtaining evacuation object information about the image forming apparatus from a volatile storage of the image forming apparatus and storing as snapshot data the obtained evacuation object information in a nonvolatile storage of the image forming apparatus, in a power supply continuation period from a time of a power-off operation to a time of a power shutdown; and
(b) starting up, when a power-on operation has subsequently been performed after the power-off operation, the image forming apparatus by using the snapshot data,
wherein the step (b) includes:
(b-1) detecting, when the power-on operation has been performed, presence or absence of a change related to a device configuration of the image forming apparatus, by comparing the device configuration of the image forming apparatus at the time of the power-off operation with the device configuration of the image forming apparatus at a time of the power-on operation;
(b-2) performing, when the power-on operation has been performed, a first snapshot developing process, the first snapshot developing process being performed in such a manner that first partial data of the snapshot data are written back from the nonvolatile storage to the volatile storage, the first partial data being evacuation object information about a common device group in various device configurations; and
(b-3) performing also a second snapshot developing process, when the power-on operation has been performed and it is detected that there is no change related to the device configuration of the image forming apparatus, the second snapshot developing process being performed in such a manner that second partial data of the snapshot data are written back from the nonvolatile storage to the volatile storage, the second partial data being evacuation object information about a non-common device group whose presence or absence is changeable in the various device configurations.

9. The non-transitory computer-readable recording medium according to claim 8, wherein the step (b) includes:
(b-4) performing, when the power-on operation has been performed and it is detected that there is a change related to the device configuration of the image forming apparatus, an initialization process with respect to the non-common device group instead of the second snapshot developing process with respect to the non-common device group.

10. The non-transitory computer-readable recording medium according to claim 9, wherein when the power-on operation has been performed, after the first snapshot developing process with respect to the common device group is performed in the step (b-2), presence or absence of a change related to the device configuration of the image forming apparatus is detected in the step (b-1),
when a detection result showing that there is no change related to the device configuration of the image forming apparatus is obtained in the step (b-1), the second snapshot developing process with respect to the non-common device group is also performed in the step (b-3), and
when a detection result showing that there is a change related to the device configuration of the image forming apparatus is obtained in the step (b-1), the initialization process with respect to the non-common device group is performed in the step (b-4).

11. The non-transitory computer-readable recording medium according to claim 9, wherein when the power-on operation has been performed, after a detection result showing that there is no change related to the device configuration of the image forming apparatus is obtained in the step (b-1), the first snapshot developing process with respect to the common device group is performed in the step (b-2), and the second snapshot developing process with respect to the non-common device group is also performed in the step (b-3), and
when the power-on operation has been performed, after a detection result showing that there is a change related to the device configuration of the image forming apparatus is obtained in the step (b-1), the first snapshot developing process with respect to the common device group is performed in the step (b-2), and the initialization process with respect to the non-common device group is performed in the step (b-4).

12. The non-transitory computer-readable recording medium according to claim 8, wherein in the step (a), data including the first partial data and the second partial data are obtained as the snapshot data and are stored in the nonvolatile storage in the power supply continuation period starting from the time of the power-off operation.

13. The non-transitory computer-readable recording medium according to claim 8, wherein in the step (a), first data corresponding to the first partial data and second data corresponding to the second partial data are obtained as the snapshot data and stored in the nonvolatile storage in the power supply continuation period starting from the time of the power-off operation.

14. The non-transitory computer-readable recording medium according to claim 8, wherein in the step (a), first data corresponding to the first partial data and second data corresponding to both of the first partial data and the second partial data are obtained as the snapshot data and stored in the nonvolatile storage in the power supply continuation period starting from the time of the power-off operation, and
in the step (b-2) and the step (b-3), the first snapshot developing process and the second snapshot developing process are performed by using the second data.

* * * * *